United States Patent
Seo

(10) Patent No.: US 11,170,182 B2
(45) Date of Patent: Nov. 9, 2021

(54) BRAILLE EDITING METHOD USING ERROR OUTPUT FUNCTION, RECORDING MEDIUM STORING PROGRAM FOR EXECUTING SAME, AND COMPUTER PROGRAM STORED IN RECORDING MEDIUM FOR EXECUTING SAME

(71) Applicant: SENSEE, INC., Daejeon (KR)

(72) Inventor: In Sik Seo, Daejeon (KR)

(73) Assignee: SENSEE, INC., Daejeon (KR)

( * ) Notice: Subject to any disclaimer, the term of this patent is extended or adjusted under 35 U.S.C. 154(b) by 82 days.

(21) Appl. No.: 16/171,843

(22) Filed: Oct. 26, 2018

(65) Prior Publication Data

US 2020/0104373 A1 Apr. 2, 2020

(30) Foreign Application Priority Data

Oct. 1, 2018 (KR) .................. 10-2018-0117194

(51) Int. Cl.
*G06F 40/51* (2020.01)
*G06F 40/58* (2020.01)
(Continued)

(52) U.S. Cl.
CPC .............. *G06F 40/51* (2020.01); *G06F 40/58* (2020.01); *G06K 9/00463* (2013.01); *G06K 9/03* (2013.01);
(Continued)

(58) Field of Classification Search
CPC .. G09B 21/003; G09B 21/007; G09B 21/008; G09B 21/02; G09B 17/00; G09B 21/001;
(Continued)

(56) References Cited

U.S. PATENT DOCUMENTS 5,576,955 A 11/1996 Newbold et al.
6,351,726 B1 2/2002 Wong
(Continued)

FOREIGN PATENT DOCUMENTS

CN 106547741 A 3/2017
CN 106776515 A 5/2017
(Continued)

OTHER PUBLICATIONS

Dasgupta, Tirthankar, and Anupam Basu. "A speech enabled Indian language text to Braille transliteration system." 2009 International Conference on Information and Communication Technologies and Development (ICTD). IEEE, 2009. (Year: 2009).*
(Continued)

*Primary Examiner* — Mark Villena
(74) *Attorney, Agent, or Firm* — Birch, Stewart, Kolasch & Birch, LLP

(57) ABSTRACT

The present invention relates to a braille editing method using an error output function, a recording medium storing program for executing the same, and a computer program stored in a recoding medium for executing the same. More particularly, the present invention relates to a braille editing method using an error output function, a recording medium storing program for executing the same, and a computer program stored in a recoding medium for executing the same, that are capable of finding a location where a braille translation error has occurred by utilizing index information when detecting the error and thus facilitating correction.

11 Claims, 5 Drawing Sheets

(51) Int. Cl.
*G06K 9/00* (2006.01)
*G06K 9/03* (2006.01)
*G09B 21/00* (2006.01)

(52) U.S. Cl.
CPC ....... *G09B 21/003* (2013.01); *G06K 2209/01* (2013.01)

(58) Field of Classification Search
CPC ..... G09B 21/04; G06F 12/1408; G06F 3/016; G10L 2013/083; H04M 1/72591
See application file for complete search history.

(56) References Cited

U.S. PATENT DOCUMENTS

| | | |
|---|---|---|
| 8,296,124 B1 | 10/2012 | Holsztynska et al. |
| 10,601,980 B1* | 3/2020 | Engelke .............. G10L 15/26 |
| 2001/0029455 A1 | 10/2001 | Chin et al. |
| 2003/0040900 A1 | 2/2003 | D'Agostini |
| 2005/0267736 A1 | 12/2005 | Nye |
| 2006/0198679 A1* | 9/2006 | Tanaka ................ B41J 11/666 400/109.1 |
| 2007/0050182 A1 | 3/2007 | Sneddon et al. |
| 2008/0303645 A1* | 12/2008 | Seymour ............. G09B 21/003 340/407.2 |
| 2009/0104587 A1* | 4/2009 | Fabrick, II ........... G09B 21/00 434/113 |
| 2011/0016389 A1* | 1/2011 | Gordon ................ G06F 40/151 715/271 |
| 2014/0257786 A1 | 9/2014 | Anisimovich et al. |
| 2016/0148538 A1* | 5/2016 | Al-Busaidi .......... G09B 21/003 434/114 |
| 2016/0364136 A1* | 12/2016 | Ragavan ............. G06F 40/166 |
| 2018/0088770 A1* | 3/2018 | Brombach ............ G06F 3/0488 |
| 2018/0137781 A1* | 5/2018 | Tikkun .................... G09B 5/04 |
| 2018/0190151 A1 | 7/2018 | Seo |
| 2018/0190152 A1 | 7/2018 | Seo |
| 2018/0204484 A1 | 7/2018 | Seo |

FOREIGN PATENT DOCUMENTS

| | | |
|---|---|---|
| EP | 1912164 A2 | 4/2008 |
| JP | 2006-243389 A | 9/2006 |
| JP | 2007-33964 A | 2/2007 |
| JP | 2008-149683 A | 7/2008 |
| JP | 2015-64813 A | 4/2015 |
| KR | 2000-0002842 A | 1/2000 |
| KR | 10-2000-0057355 A | 9/2000 |
| KR | 10-0697625 B1 | 3/2007 |
| KR | 10-2007-0071160 A | 7/2007 |
| KR | 10-2012-0080752 A | 7/2012 |
| KR | 10-1752351 B1 | 6/2017 |
| KR | 10-1789560 B1 | 11/2017 |

OTHER PUBLICATIONS

European Search Report for Appl. No. 19178306.7 dated Aug. 2, 2019.

Schack, A.S., et al, "Braille Translation System for the IBM 704," Jan. 1, 1961, pp. 1-80, retrieved from the internet: URL: http://www.duxburysystems.org/downloads/library/history/1961_ibm.pdf.

American Printing House for the Blind, "BrailleBlaster User Guide," https://web.archive.org/web/20170630212118/https://brailleblaster.org/docs#Correct-Braille-Translation, 2016, pp. 1-79.

Katman, "PC Automatic Braille Translation System Blemish-chan, Ver. 4 0, (Japan Braille notation compliant 2001)," https://web.archive.org/web/20060709193249/http://www17.plala.or.jp/otenchan/, 2001, 18 pages, with English translation.

2nd Office Action issued by the IP Australia dated Nov. 17, 2020.

* cited by examiner

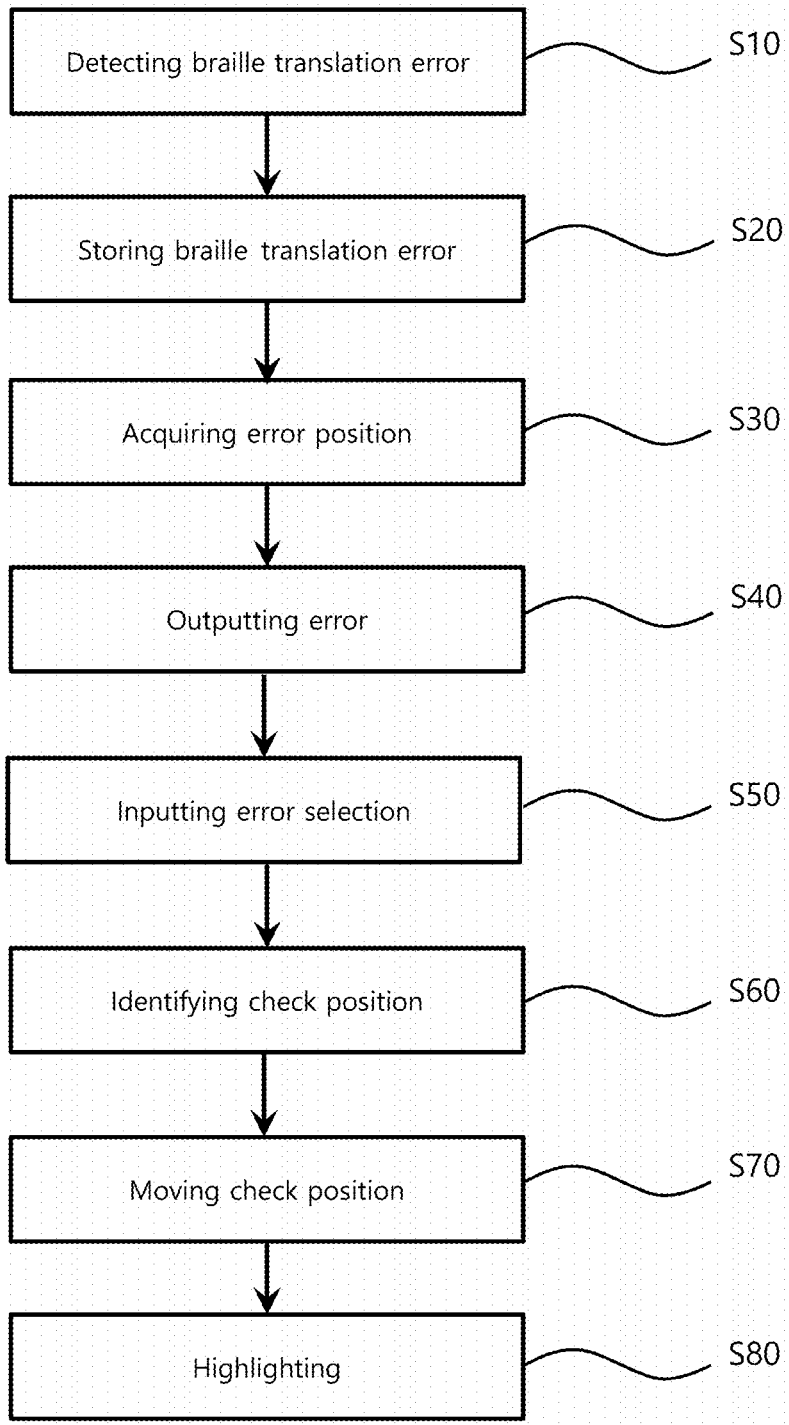

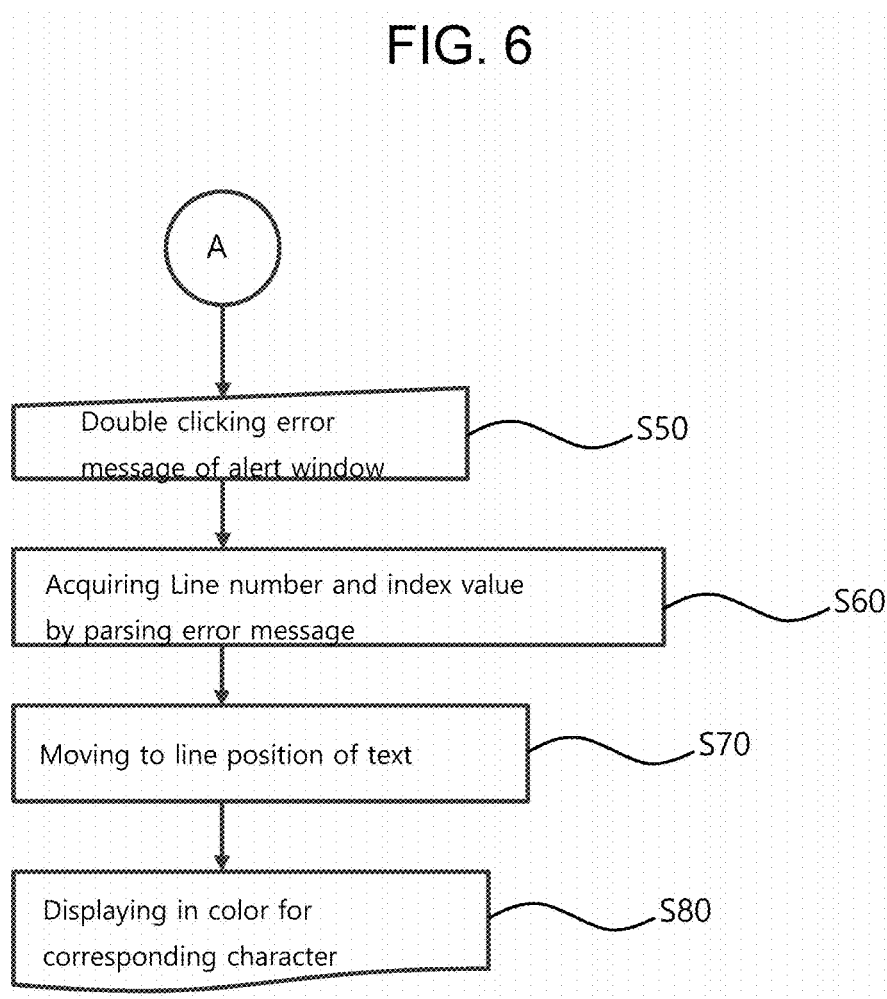

BRAILLE EDITING METHOD USING ERROR OUTPUT FUNCTION, RECORDING MEDIUM STORING PROGRAM FOR EXECUTING SAME, AND COMPUTER PROGRAM STORED IN RECORDING MEDIUM FOR EXECUTING SAME

CROSS REFERENCE TO RELATED APPLICATION

The present application claims priority to Korean Patent Application No. 10-2018-0117194, filed Oct. 1, 2018, the entire contents of which is incorporated herein for all purposes by this reference.

BACKGROUND OF THE INVENTION

Field of the Invention

The present invention relates to a braille editing method using an error output function, a recording medium storing program for executing the same, and a computer program stored in a recoding medium for executing the same. More particularly, the present invention relates to a braille editing method using an error output function, a recording medium storing program for executing the same, and a computer program stored in a recoding medium for executing the same, that are capable of finding a location where a braille translation error has occurred by utilizing index information when detecting the error and thus facilitating correction.

Description of the Related Art

Braille is a character symbol system that gives meaning to various dot patterns so that people can read and write through the tactile sensation. Generally, 3*2 or 4*2 dot patterns are widely for a braille character system, and the character system is constructed by varying the number and arrangement of dots.

Meanwhile, with the development of information and communication industries, the use of information and communication devices such as computers, mobile phones, personal digital assistants (PDAs), and portable multimedia players (PMPs) has become common nowadays. However, since a physically challenged person, for example, a visually impaired person cannot easily use information and communication devices, the visually impaired person feels alienated in the utilization of information and communication devices, which results in a digital divide. Therefore, it is required to eliminate economic and social inequality with regard to the access to information and communication technologies.

In order to alleviate this problem, technologies for converting public documents into braille documents have been developed. However, since most users who use these technologies are not visually impaired persons, there is a problem that it is difficult for user unfamiliar with braille to find and correct an error occurring in the process of converting the text document into the braille document.

Korean Patent No. 10-1752351 discloses a book content braille output device.

DOCUMENTS OF RELATED ART (Patent Document 1) Korean Patent No. 10-1752351 (registered on Jun. 23, 2017)

SUMMARY OF THE INVENTION

Accordingly, the present invention has been made keeping in mind the above problems occurring in the prior art, and an object of the present invention is to provide a braille editing method using an error output function, a recording medium storing program for executing the same, and a computer program stored in a recoding medium for executing the same, that are capable of finding a location where a braille translation error has occurred by utilizing index information when detecting the error and thus facilitating correction.

The objects of the embodiments of the present invention are not limited to the above-mentioned objects, and other objects not mentioned can be clearly understood by those skilled in the art from the following description.

In order to achieve the above-mentioned object, a braille editing method using a braille translation error output function according to an embodiment of the present invention is configured in a form of program executed by an operation processing unit including a computer, the method including: converting, by the operation processing unit, a text character of a text document into a braille character on the basis of a braille code table and detecting the braille translation error when converting the text character into the braille character; storing, by the operation processing unit, in an error list, a braille translation error character corresponding to the braille translation error detected in the converting the text character; acquiring, by the operation processing unit, index information by searching the text document for a text character corresponding to the braille translation error character stored in the error list; and generating, by the operation processing unit, an error message including the braille translation error character stored in the storing the braille translation error and the index information acquired in the acquiring the index information and then outputting the error message through an alert window.

In addition, in the converting of the text character, when a text character of the text document is not included in a braille code table on the basis of the braille code table, it may be determined as the braille translation error.

In addition, the index information may include an index value used as an index to identify a line number and an n-th character.

In addition, the converting of the text character may convert the text document into the braille document and generate the index information on a character in which the conversion task is completed.

In addition, the acquiring of the index information may generate the index information on a character in which the conversion task is completed.

In addition, the braille editing method may be provided such that a text window in which a content of the text document is displayed, a braille window in which a content of the braille document is displayed, an alert window in which the error message may be displayed on one screen.

In addition, the braille editing method further may include, after the outputting of the error message, receiving, by the operation processing unit, information in which any one of error messages in the alert window is selected by a user; identifying a check position by allowing the operation processing unit to acquire the index information on the basis of the error messages; and moving a check position by allowing the operation processing unit to move the screen to a corresponding position of the text window on which a content of the text document is displayed.

In addition, the braille editing method may further include, after the moving of the check position, performing highlighting, by the operation processing unit, to visually identify the text character corresponding to the braille translation error character displayed on the text window.

Further, according to an embodiment of the present invention, a computer-readable recording medium storing a program for executing the braille editing method using the error output function is provided.

Further, according to an embodiment of the present invention, a computer program stored in a computer-readable recoding medium for executing the braille editing method using the error output function is provided.

According to a braille editing method using an error output function according to an embodiment of the present invention, there is an advantage that it is possible to find a position where a braille translation error has occurred by utilizing the index information when detecting the error and thus facilitate correction of the error.

In addition, there is an advantage that when the text character is not included in the braille code table, it is determined as the braille translation error, thereby detecting the braille translation error more easily.

In addition, there is an advantage that the line number and the index value are used as the index information, wherein the line number is used when the portion corresponding to the braille translation error of the document content is output to an alert window, and the index value is used for the search and etc., thereby making it possible to quickly correct the braille translation error.

In addition, there is an advantage that the index information is generated in the braille translation step and the error position acquiring step, so that the index information can be assigned in real time or collectively according to the situation, thereby improving the efficiency of document management.

In addition, since the text window, the braille window, and the alert window can be simultaneously output on one screen, there is an advantage that the user who performs a braille translation task can check a needed portion quickly and can easily correct the braille translation error.

Further, when an error message is selected by the user after the error output step, the index information is acquired and the corresponding content of each document is displayed, thereby making it easier to correct the braille translation error.

In addition, there is an advantage that the text character corresponding to the braille translation error character is visually highlighted, thereby making it easier to correct the braille translation error.

In addition, there is an advantage that by using an index code, which is an index value additionally displayed for each minimum representation unit, in addition to index values assigned to characters and typeset sign characters, the text document and the braille document can be synchronized thereby performing the task more easily.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a flowchart of a braille editing method using an error output function according to another embodiment of the present invention; and FIG. 6 is a flowchart followed by a procedure of FIG. 2 according to an embodiment.

DETAILED DESCRIPTION OF THE INVENTION

Figure 1:
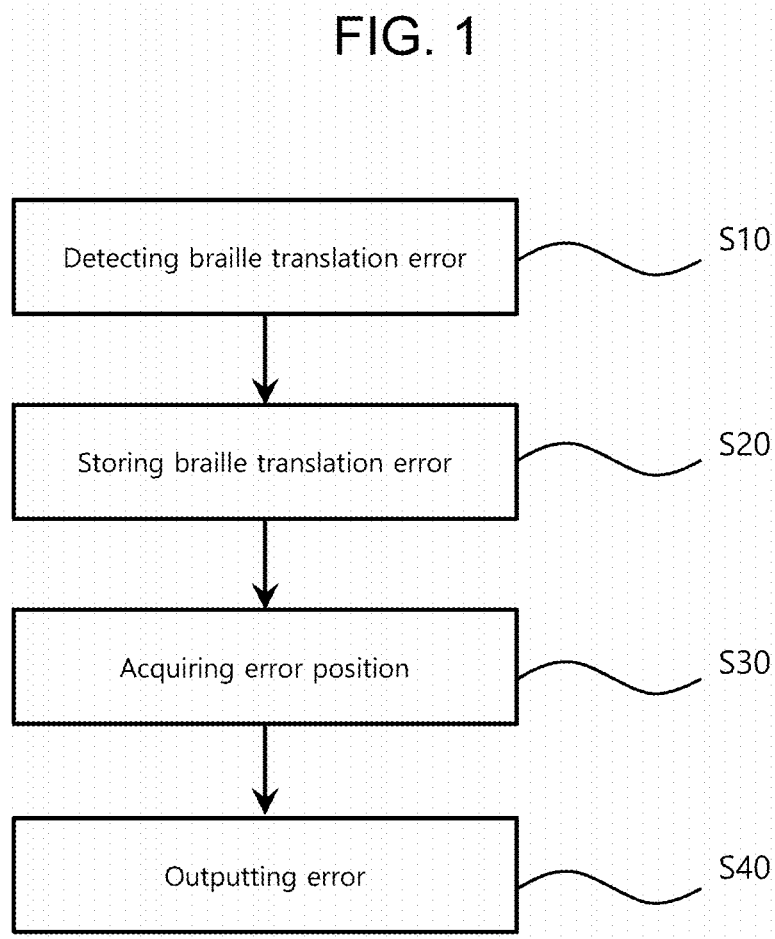
FIG. 1 is a flowchart of a braille editing method using an error output function according to an embodiment of the present invention.

While various modifications and alternative forms of the invention are possible, specific embodiments thereof are shown by way of example in the drawings and will herein be described in detail. It is to be understood, however, that the invention is not intended to be limited to the particular embodiments, but includes all modifications, equivalents, and alternatives falling within the spirit and scope of the invention.

It is to be understood that when an element is referred to as being "coupled" or "connected" to another element, it may be directly coupled or connected to the other element or have another element in between.

On the other hand, when an element is referred to as being "directly coupled" or "directly connected" to another element, it should be understood that there are no other elements in between.

The terminology used herein is for the purpose of describing particular embodiments only and is not intended to be limiting of the invention. The singular forms include plural referents unless the context clearly dictates otherwise. In the present application, the terms "comprising", "having", etc. are intended to specify the presence of stated features, integers, steps, operations, elements, parts, or combinations thereof, but are not to be construed as preliminary to the existence or addition of one or more of the terms, numbers, processes, operations, components, parts, or combinations thereof.

Unless otherwise defined, all terms used herein, including technical or scientific terms, have the same meaning as commonly understood by one of ordinary skill in the art to which this invention belongs. Terms such as those defined in commonly used dictionaries should be construed as meaning consistent with meaning in the context of the relevant art and are to be construed in an ideal or overly formal sense unless expressly defined in the present application.

Hereinafter, the present invention will be described in more detail with reference to the accompanying drawings. Prior to this, terms and words used in the present specification and claims should not be construed as limited to ordinary or dictionary terms, and the inventor should appropriately interpret the concept of the term appropriately to describe his or her own invention in the best way. It should be construed as meaning and concept consistent with the technical idea of the present invention. It is to be understood that, unless otherwise defined, technical and scientific terms used herein have the same meaning as commonly understood by one of ordinary skill in the art to which this invention belongs. Descriptions of known functions and configurations that may obfuscate the present invention are omitted. The following drawings are provided by way of example so that those skilled in the art can fully understand the spirit of the present invention. Therefore, the present invention is not limited to the following drawings, but may be embodied in other forms. In addition, like reference numerals designate like elements throughout the specification. It is to be noted that the same elements among the drawings are denoted by the same reference numerals whenever possible.

Figure 2:
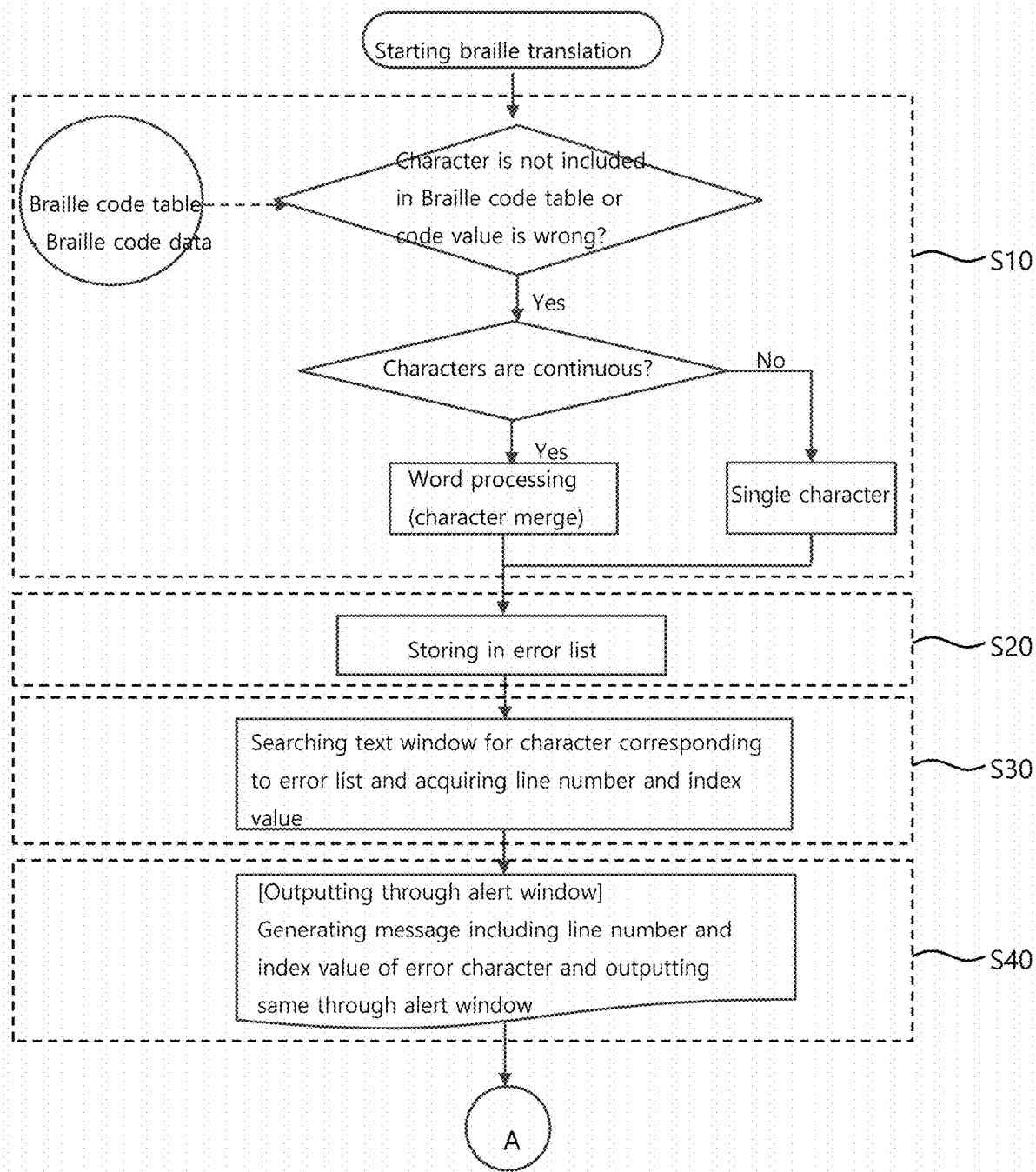
FIG. 2 is a flow diagram according to an embodiment of FIG. 1.
Figure 3:
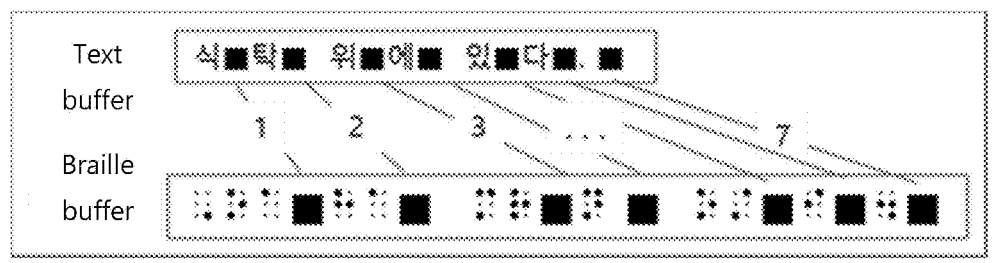
FIG. 3 is a view illustrating an index value assigned to line break in a braille editing method using an error output function according to an embodiment of the present invention.
Figure 4:
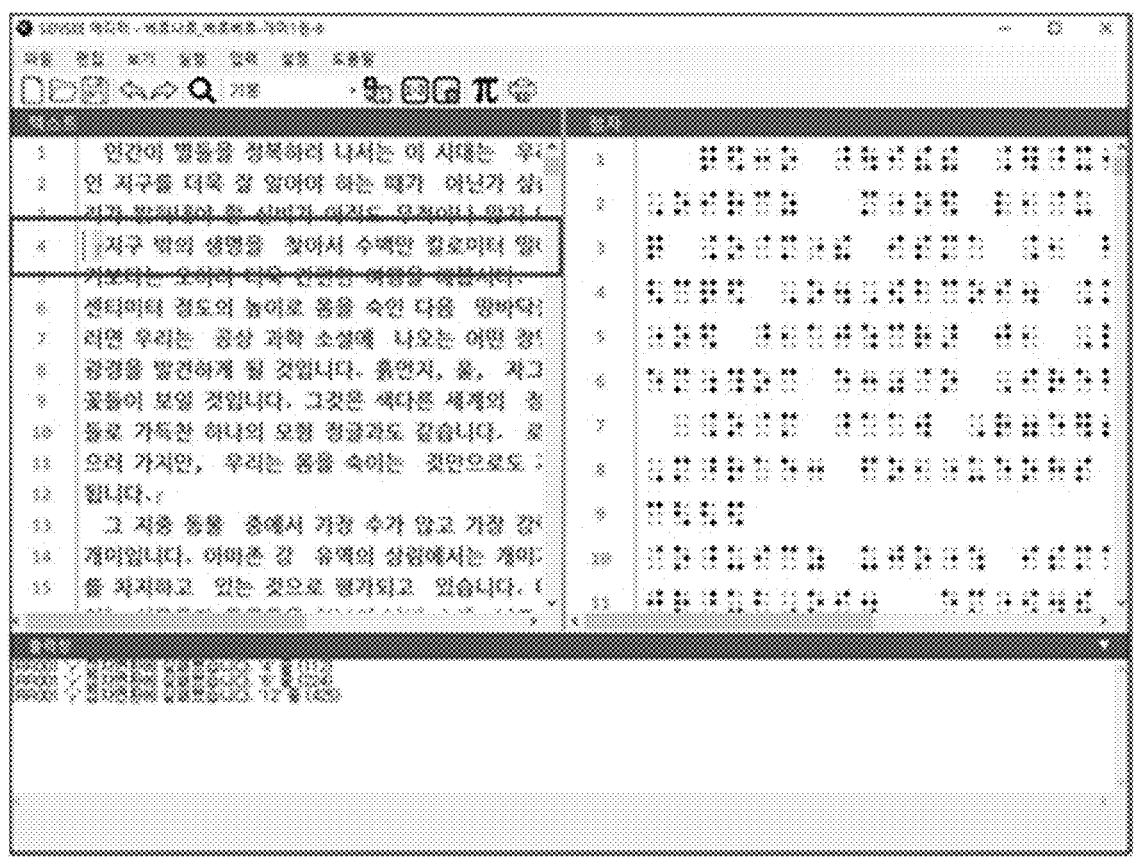
FIG. 4 is a view illustrating an example of a screen interface in a braille editing method using an error output function according to an embodiment of the present invention.

FIG. 1 is a flowchart of a braille editing method using a error output function according to an embodiment of the present invention, FIG. 2 is a flow diagram according to an embodiment of FIG. 1, FIG. 3 is a view illustrating an index value assigned to line break in a braille editing method using an error output function according to an embodiment of the present invention, FIG. 4 is a view illustrating an example of a screen interface in a braille editing method using an error output function according to an embodiment of the present invention, FIG. 5 is a flowchart of a braille editing method using an error output function according to another embodiment of the present invention, and FIG. 6 is a flowchart followed by a procedure of FIG. 2 according to an embodiment.

Prior to the description, the terms used in this specification (and claims) will be briefly described: "text character" means a character that is visually readable;

"text document" means a document consisting of text characters;

"braille character" means a character that is readable by a tactile sense; and "braille document" means a document consisting of braille characters.

As shown in FIGS. 1 and 2, a braille editing method using a braille error output function according to an embodiment of the present invention is configured in a form of a program executed by an operation processing unit including a computer and includes a braille translation step S10, a braille translation error storing step S20, an error position acquiring step S30, and an error output step S40. In the braille translation step S10, the operation processing unit converts a text character of a text document into a braille character on the basis of a braille code table, and detects a braille translation error when converting the text character into the braille character.

The braille translation step S10 is a step of translating the text document to convert the same into the braille document, and herein when a braille translation error occurs during the procedure, the error is detected.

Herein, a text document may be a PDF document (Adobe Systems), a Korean document (Korean and Computer), a Word document (Microsoft), an MS-DOS standard-text document, and the like, in which the text document consists of a set of strings that a person may visually recognize with respect to characters of each language group. The set of strings that is well known include a set of ASCII strings and a set of Unicode strings.

The braille translation step S10 may convert a text document, which is a previously prepared original file (a file having an extension of pdf, txt, or the like), into a braille document, and later store the braille document as a braille file (a file having an extension of bbf, brf, brl, nib, or the like).

In the braille translation step S10, the braille translation task is performed until it is completed for all the characters except the text character corresponding to the braille translation error in the text document, or the braille translation task is continuously performed until a separate stop command is received.

The braille translation step S10 may perform a line break of the braille document according to the line break reference of the braille document (braille window) in the process of translating the text document to convert the same into the braille document.

In the braille translation error storing step S20, the operation processing unit stores, in an error list, the braille translation error character corresponding to the braille translation error detected in the braille translation step S10.

The braille translation error storing step S20 stores, in the error list, the text character corresponding to the braille translation error character obtained by detecting a braille translation error in the process of converting the text characters into the braille characters.

Here, the error list refers to a name of a storage space in which the text characters with braille translation errors are stored according to a predetermined criterion such as a method of sequentially storing the text characters.

In the error position acquiring step S30, the operation processing unit searches the text document for a text character corresponding to the braille translation error character stored in the error list and thus obtains index information.

The index information may be used to check the position (side, line, order, etc.) of the corresponding text character in the text document, or used for improving the efficiency of document management by being used for faster searches.

In the error output step S40, the operation processing unit generates an error message including the braille translation error character stored in the braille translation error storing step S20 and the index information acquired in the error position acquiring step S30, and outputs the same through an alert window.

The error output step S40 outputs an error message such as "ERR001: 'r' braille translation failed '4' line (112)" (see FIG. 4) through the alert window.

The alert window refers to a part of the screen interface in which the error message is displayed.

In the braille translation step S10 of the braille editing method using an error output function according to an embodiment of the present invention, when a text character of the text document is not included in a braille code table on the basis of the braille code table, it is determined as a braille translation error.

That is, when the text character that is not included in the braille code table is detected, the braille translation step S10 determines it as the braille translation error.

The braille code table may be called a braille code dictionary, braille code data, braille table, etc., and the text character and the braille character are manufactured as to be matched one to one or one to n (n is a natural number).

Most of the basic braille tables are matched one to one.

However, the matching of one to n occurs according to special conditions, complex conditions, and conditions of use, and there may occur a case in which it is necessary to perform multiple matching operations due to special conditions and complex conditions thereby finding an appropriate conversion value and performing the conversion task.

For example, the matching of one to n may be applied to homonyms. Many braille characters may be provided in such a manner as to be matched to a text character, in which for example, "," is used as a comma and also is used as a sign marking every three digits in an amount of money, etc.

The index information of the braille editing method using the error output function according to an embodiment of the present invention may include an index value used as an index for identifying a line number and an n-th character.

The line number refers to a number that may identify n-th line in the text document. In addition, a document managed by the line number may be displayed as a number corresponding to n-th line in the document, and a document managed by a unit of a page may be displayed on an n-th line in the page.

The index value may indicate the order of the characters using numbers, in which the characters preferably include typeset sign characters (space, line break, etc.).

The index value may be additionally displayed (index code) for each minimum representation unit of a character, in addition to the index values assigned to a character (text, braille), a typeset sign character (space), a line break, and the like.

In addition, the index value additionally displayed for each minimum representation unit of a character will be expressed by an index code, which will be described later.

The braille page may be set as "column (the number of characters per line)*the number of lines", and the setting of the braille page is adjusted to the paper setting of the braille printer. The content of the braille document are output according to the setting of the braille page.

For example, in a text document (such as an ink-character document), a single-line sentence may be occasionally output as two lines according to the braille page setting (32×26) in a braille document.

Therefore, it is preferable to synchronize (document synchronization) between documents shown in a text window and a braille window which will be described later, because it makes it easier to perform the task of correcting the braille translation error.

The document synchronization is to change the setting (format) of the text document in such a manner as to be matched with the settings of a braille page.

That is, the document synchronization is to change the format of the text document so as to be the same as the format of the braille document.

In other words, the document synchronization is such that when the lines 1 to 10 are output through the braille window, lines 1 to 10 are also output through the text window.

By using the document synchronization function, it is possible to more rapidly perform a task of clicking a line number in the text document to make it possible to be moved to the corresponding line in the braille document, and clicking a line number in the braille document to make it possible to be moved to the corresponding line in the text document.

The document synchronization function allows users who are not familiar with braille to make the braille document by correcting only a text document. Intuitive and easy line-by-line comparison makes it possible to make braille documents faster and easier.

What is important for document synchronization is to make a format of the text document be the same as that of braille document.

In addition, the index code used for a line break has to be inserted into an adequate position.

The Index code may use values between 0x01 and 0x08, which are not commonly used in general documents of ASCII codes.

As shown in FIG. 3, the index code is inserted into both the text buffer and the braille buffer (indicated by ■ in FIG. 3).

The index code may be inserted behind the corresponding position whenever performing braille translation for each of numbers, symbols, characters, or words.

However, it is preferable that the index code is not inserted after a check, a Roman alphabet letter, or a capital letter.

After the braille translation is completed, the format of lines in the text buffer and the braille buffer is changed as to be matched with a column (the number of characters) of the braille page. Here, the index code is used (the index code is based).

That is, it is possible to perform a line break on the basis of the index code. This is because the meaning of some braille such as the abbreviation of braille may be not understood accurately when they are spaced.

The braille translation step S10 of the braille editing method using the error output function according to an embodiment of the present invention may convert a text document into a braille document and generate index information on a character in which the conversion task is completed.

That is, the index information may be assigned to text characters and braille characters in real time at the moment when the text characters are translated to be converted into braille characters.

In other words, the index information may be assigned in real time in the braille translation step S10.

The error location acquiring step S30 of the braille editing method using the error output function according to an embodiment of the present invention may be provided such that the index information is generated on a character in which conversion task is completed.

That is, the index information may be given in the error position acquiring step S30.

Herein, the index information may be assigned to the text characters and the braille characters collectively after completing the translation of all the characters except the text characters corresponding to the braille translation error in the text document.

As shown in FIG. 4, the braille editing method using the error output function according to an embodiment of the present invention is provided such that a text window in which a content of a text document is displayed, a braille window in which a content of a braille document is displayed, and an alert window in which an error message is displayed are displayed on one screen.

The text window refers to a part of a screen interface in which a content capable of being displayed on a screen of text window among the text document is displayed; the braille window refers to a part of the interface in which a content capable of being displayed on a screen of braille window among the braille document is displayed; and the alert window refers to a part of the screen interface in which a content of the error message is displayed.

In other words, the text window is formed in a part of the screen interface displayed on a screen such as a monitor, the braille window is formed in other part, and the alert window is formed in still other part, so that the text window, the braille window, the alert window are displayed on one screen (See FIG. 4).

As shown in FIGS. 5 to 6, the braille editing method using the error output function according to an embodiment of the present invention includes an error select input step S50, a check position identification step S60, and a check position moving step S70, after the error output step S40.

In the error select step S50, the operation processing unit receives information in which any one of error messages of the alert window is selected by a user.

When the user selects any one of the error messages (click, double-click, function key input, etc.) of the alert window using the input means (mouse, keyboard, etc.), the error select step S50 receives the information input through the input means.

In the check position identification step S60, the operation processing unit acquires index information on the basis of the error message.

For example, as shown in FIG. 3, in a case that an error message such as "ERR001: 'r' braille conversion failed '4' line (112)" (see FIG. 4) is output through the alert window, when a rule is applied wherein the error code ends with ":" the error character and the line number are indicated by ' ', and the index value is indicated by ( ), the line number and index value information may be obtained by parsing (separating) the corresponding error message.

The index information may be assigned to characters (letters, words, type code characters, etc.), but may be assigned after the braille translation task and may be assigned again after performing correction task on the error message.

Therefore, the user does not continuously use the index information that is determined once, but acquires the index information when the user selects any one of the error messages.

In the check position moving step S70, the operation processing unit moves the screen to the corresponding position of the text window where the content of the text document is displayed.

When the user selects any one of the error messages, the check position moving step S70 may move the screen so that the text message related to the error message is displayed on the text window, whereby the user may identify the text message associated with the error message.

Here, moving the screen is a representation viewed from the standpoint of a user, and is to display, on the text window, a text character associated with the error message among the content of the text document is displayed on the text window so that the user may visually identify the text character.

For example, when line number 123 (page 13) is displayed on the text window, but the user selects an error message corresponding to line number 13 (page 2), line number 13 (page 2) will be displayed on the text window.

As shown in FIG. 1, a braille editing method using an error output function according to an embodiment of the present invention further includes performing highlighting, by the operation processing unit, to visually identify the text character corresponding to the braille translation error character displayed on the text window, after the check position moving step S70.

That is, the highlighting step S80 performs highlighting on the text character corresponding to the braille translation error character.

Here, the highlighting refers to a display capable of being distinguished from surrounding characters by formatting such as color display, bold, underline, flicker effect, and the like.

Herein, the highlighting step S80 is provided such that not only a text character corresponding to the braille translation error character is highlighted but also a text character adjacent thereto is highlighted in a different manner from the text character corresponding to the braille translation error character.

This is to display the surrounding text characters that are to be considered in order to understand the exact meaning of the text character in which the braille translation error occurs, and it is preferable to perform highlighting differently from the text character in which the braille translation error occurred.

It is more important that the highlighting is differentiated according to importance.

For example, it is possible to be variously implemented like that a text character in which the braille translation error occurs may be displayed in red; text characters immediately before and after the text character in which the braille translation error occurs may be displayed in orange; a text character next to the same may be displayed in yellow; and the like.

Although the braille editing method using the braille error output function according to an embodiment of the present invention has been described above, a computer readable recording medium storing program for implementing the braille editing method using the braille error output function and a program stored in a computer readable recording medium for implementing the braille editing method using the error output function may also be implemented.

That is, it is possible to easily understand by those skilled in the art that the braille editing method using the error output function described above may be included in a recording medium readable by a computer by tangibly embodying a program of instructions for implementing the braille editing method. In other words, it can be implemented in the form of a program command that can be executed through various computer means, and can be recorded on a computer-readable recording medium. The computer-readable recording medium may include program instructions, data files, data structures, and the like, alone or in combination. The program instructions recorded on the computer-readable recording medium may be those specially designed and constructed for the present invention or may be available to those skilled in the art of computer software. Examples of the computer-readable recording medium include magnetic media such as hard disks, floppy disks and magnetic tape, optical media such as CD-ROMs and DVDs, optical disks such as floppy disks, magneto-optical media, and hardware devices specifically configured to store and execute program instructions such as ROM, RAM, flash memory, USB memory, and the like. Examples of program instructions include machine language code such as those generated by a compiler, as well as high-level language code that can be executed by a computer using an interpreter or the like. The hardware device may be configured to operate as one or more software modules to perform the operations of the present invention, and vice versa.

It will be understood by those skilled in the art that various changes in form and details may be made therein without departing from the scope of the present invention as defined by the appended claims.

What is claimed is:

1. A braille editing method using a braille translation error output function configured in a form of a program executed by an operation processing unit including a computer, the method comprising:
receiving, by the operation processing unit, a text document including a plurality of text characters;
searching, by the operation processing unit, a braille code table for braille characters corresponding to the plurality of text characters to generate a braille document including a plurality of braille characters;
generating, by the operation processing unit, index information for synchronizing the text document with the braille document;
identifying, by the operation processing unit, at least one text character among the plurality of text characters in the text document that does not have a corresponding braille character in the braille code table;

generating, by the operation processing unit, a braille translation error including the at least one text character and index value information corresponding to the at least one text character, and storing the braille translation error in an error list; and generating, by the operation processing unit, an error message including the at least one text character corresponding to the braille translation error and the index value information corresponding to the at least one character, and displaying the error message.

2. The method of claim 1, wherein the index value information includes a line number and a character number corresponding to the braille translation error.

3. The method of claim 1, wherein the index information is generated when text characters in the text document are converted into braille characters for the braille document.

4. The method of claim 3, further comprising:
simultaneously displaying, on a screen, a text window including content of the text document, a braille window including content of the braille document and an alert window including the error message.

5. The method of claim 4, further comprising, after the outputting of the error message,
receiving, by the operation processing unit, information in which any one of error messages in the alert window is selected by a user;
identifying a check position by allowing the operation processing unit to acquire the index information based on the error messages; and
moving to the check position by allowing the operation processing unit to move the screen to a corresponding position of the text window on which a content of the text document is displayed.

6. The method of claim 5, further comprising, after the moving to the check position,
performing highlighting, by the operation processing unit, to visually identify the text character corresponding to the braille translation error character displayed on the text window.

7. The method of claim 4, further comprising:
changing formatting of the text document to have a format corresponding to a format of the braille document,
wherein lines of text within the text document are respectively displayed adjacent to corresponding lines of a braille characters within the braille document.

8. A non-transitory computer-readable recording medium storing a program for executing the braille editing method using the error output function according to claim 1.

9. A computer program stored in a non-transitory computer-readable recoding medium for executing the braille editing method using the error output function according to claim 1.

10. The method of claim 1, further comprising:
simultaneously displaying a first portion of the text document, a portion of the braille document that is void of the at least one text character corresponding to the braille translation error and the error message, wherein lines of text within the text document are respectively displayed adjacent to corresponding lines of braille characters within the braille document; and
in response to receiving a selection of the error message, disappearing the first portion of the text document and displaying a second portion of the text document that includes the at least one text character corresponding to the braille translation error.

11. The method of claim 10, wherein the displaying the second portion of the text document that includes the at least one text character corresponding to the braille translation error further includes highlighting a line of text within the text document that corresponds to the at least one text character.

\* \* \* \* \*